United States Patent
Jackson, Jr. et al.

(10) Patent No.: US 10,670,059 B2
(45) Date of Patent: Jun. 2, 2020

(54) HIGH RETENTION FORCE FASTENER

(71) Applicant: A. Raymond et Cie., Grenoble (FR)

(72) Inventors: Nicholas Jackson, Jr., Davisburg, MI (US); Todd Murray, Gains, MI (US); Isabella Barrett, Clio, MI (US)

(73) Assignee: A. Raymond et Cie, Grenoble (FR)

(*) Notice: Subject to any disclaimer, the term of this patent is extended or adjusted under 35 U.S.C. 154(b) by 156 days.

(21) Appl. No.: 15/832,003

(22) Filed: Dec. 5, 2017

(65) Prior Publication Data

US 2019/0170172 A1    Jun. 6, 2019

(51) Int. Cl.
| | |
|---|---|
| F16B 2/24 | (2006.01) |
| B60B 7/10 | (2006.01) |
| F16B 19/10 | (2006.01) |
| F16B 5/06 | (2006.01) |
| F16B 21/07 | (2006.01) |
| F16B 21/06 | (2006.01) |
| B60B 7/06 | (2006.01) |
| B60R 13/02 | (2006.01) |

(52) U.S. Cl.
CPC .............. *F16B 2/241* (2013.01); *B60B 7/105* (2013.01); *F16B 5/0642* (2013.01); *F16B 19/1081* (2013.01); *F16B 21/065* (2013.01); *F16B 21/076* (2013.01); *B60B 7/063* (2013.01); *B60R 13/0206* (2013.01)

(58) Field of Classification Search
CPC ...... F16B 2/241; F16B 5/0642; F16B 21/076; F16B 21/065; F16B 19/1081; B60B 7/105; B60B 7/063; B60R 13/0206
See application file for complete search history.

(56) References Cited

U.S. PATENT DOCUMENTS

| | | | |
|---|---|---|---|
| 2,200,702 A | 5/1940 | Oddie |
| 2,342,832 A | 2/1944 | Borchers |
| 2,414,662 A | 1/1947 | Ostrom |
| 2,652,275 A | 9/1953 | Tinnerman |
| 4,300,865 A | 11/1981 | Murray |
| 4,804,303 A | 2/1989 | Statkus |

(Continued)

FOREIGN PATENT DOCUMENTS

| | | |
|---|---|---|
| EP | 743461 A1 | 11/1996 |
| EP | 1911380 A1 | 4/2008 |

(Continued)

*Primary Examiner* — Robert Sandy
*Assistant Examiner* — Louis A Mercado
(74) *Attorney, Agent, or Firm* — Warner Norcross + Judd LLP

(57) ABSTRACT

A high retention force fastener for fixing at least two panels together is disclosed. The fastener includes two components. One component is a metal clip and the other is a plastic insert that can be substantially inserted into the metal clip. The metal clip includes a body having opposed panel engagement features extending therefrom, an insertion stop plate spaced apart from the engagement features and plastic insert locking tabs extending from the stop plate. The metal clip is preferably U-shaped and includes two sides joined by a connector. Each of the sides includes a pair of the panel engagement features. The plastic insert includes a head and a leg for insertion into the metal clip. The leg extends from the head. The plastic insert additionally includes metal tab engagement arms extending from and integrally formed with the head for engaging the plastic insert locking tabs of the metal clip.

18 Claims, 9 Drawing Sheets

(56) References Cited

U.S. PATENT DOCUMENTS

| | | |
|---|---|---|
| 5,168,604 A | 12/1992 | Boville |
| 5,261,772 A | 11/1993 | Henninger et al. |
| 5,370,484 A | 12/1994 | Morikawa et al. |
| 5,632,581 A | 5/1997 | Hasada |
| 5,775,860 A | 7/1998 | Meyer |
| 6,196,756 B1 | 3/2001 | Leverger |
| 2002/0176762 A1 | 11/2002 | Moerke |
| 2003/0017022 A1 | 1/2003 | Meyer |
| 2003/0171030 A1 | 9/2003 | Jones |
| 2004/0020016 A1 | 2/2004 | Yoneoka |
| 2004/0091334 A1 | 5/2004 | Hoshi |
| 2004/0223826 A1 | 11/2004 | Leon et al. |
| 2006/0066080 A1 | 3/2006 | Ikeda et al. |
| 2006/0198714 A1 | 9/2006 | Lesecq |
| 2008/0193250 A1 | 8/2008 | Boubtane |
| 2008/0260488 A1 | 10/2008 | Scroggie et al. |
| 2009/0263210 A1 | 10/2009 | Loewe |
| 2010/0172714 A1 | 7/2010 | Sano |
| 2010/0303539 A1 | 12/2010 | Aoki et al. |
| 2011/0020092 A1 | 1/2011 | Bentrim et al. |
| 2011/0164946 A1 | 7/2011 | Buesch et al. |
| 2011/0302765 A1 | 12/2011 | Marx et al. |
| 2012/0131771 A1 | 5/2012 | Hofmann et al. |
| 2013/0136559 A1 | 5/2013 | Hauser |
| 2013/0149066 A1 | 6/2013 | Handa et al. |
| 2014/0259564 A1 | 9/2014 | Gromes et al. |

FOREIGN PATENT DOCUMENTS

| | | |
|---|---|---|
| FR | 2928428 A1 | 9/2009 |
| FR | 2962503 A3 | 1/2012 |
| GB | 2388150 A | 11/2003 |
| JP | 2014238109 A | 12/2014 |
| WO | 201147843 A1 | 4/2011 |
| WO | 201149096 A1 | 4/2011 |
| WO | 2012144113 A1 | 10/2012 |
| WO | 2016171863 A1 | 10/2016 |

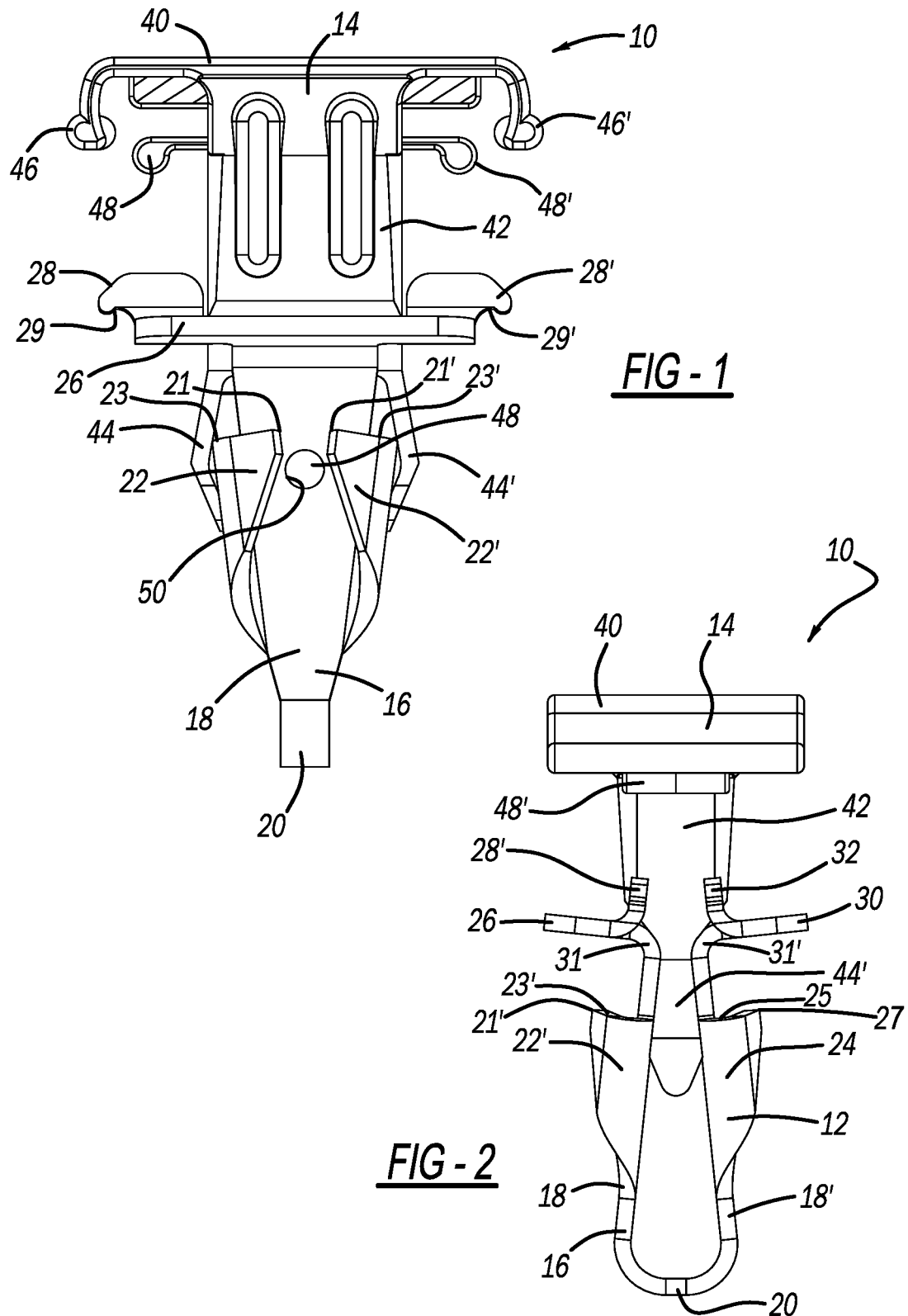

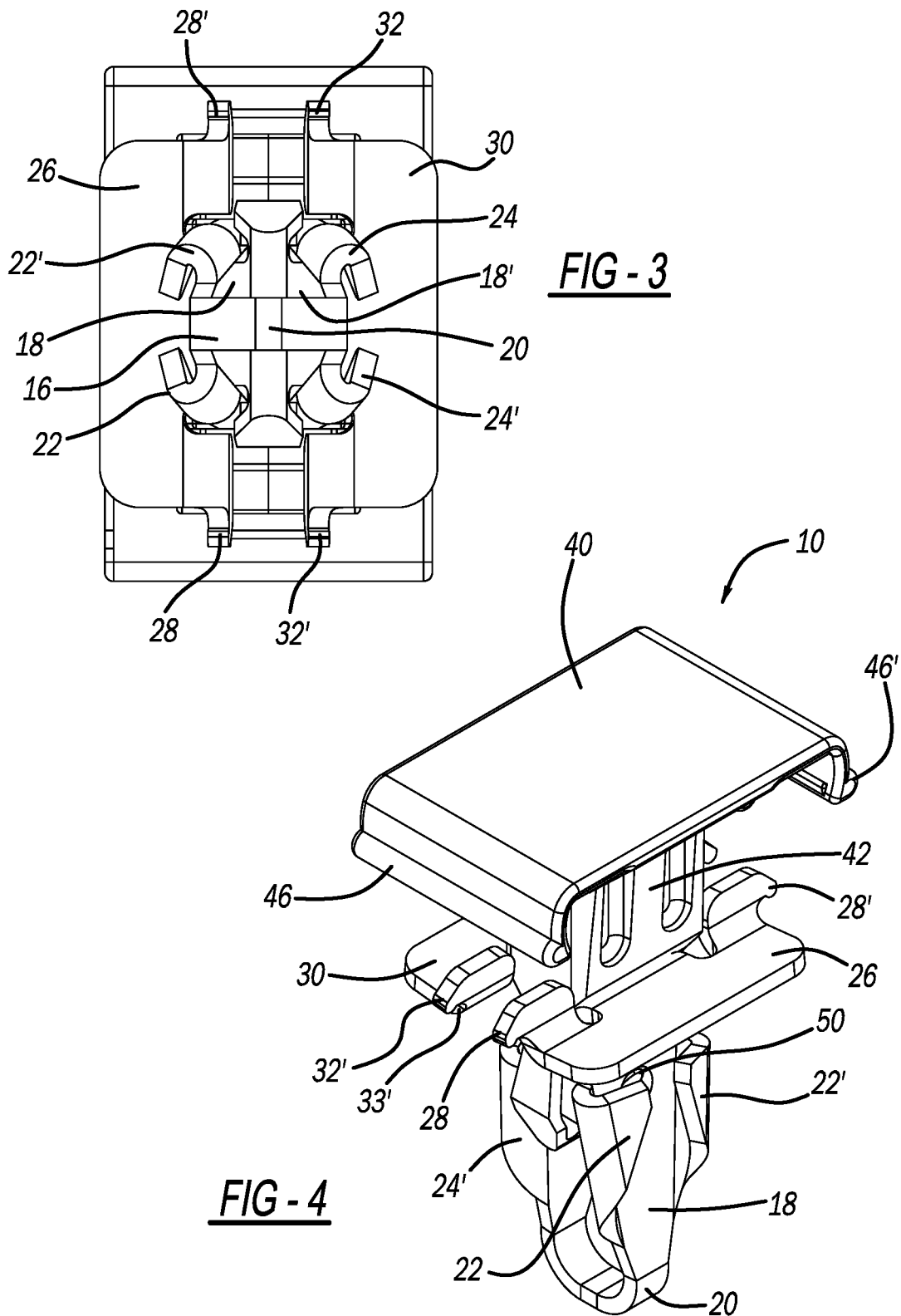

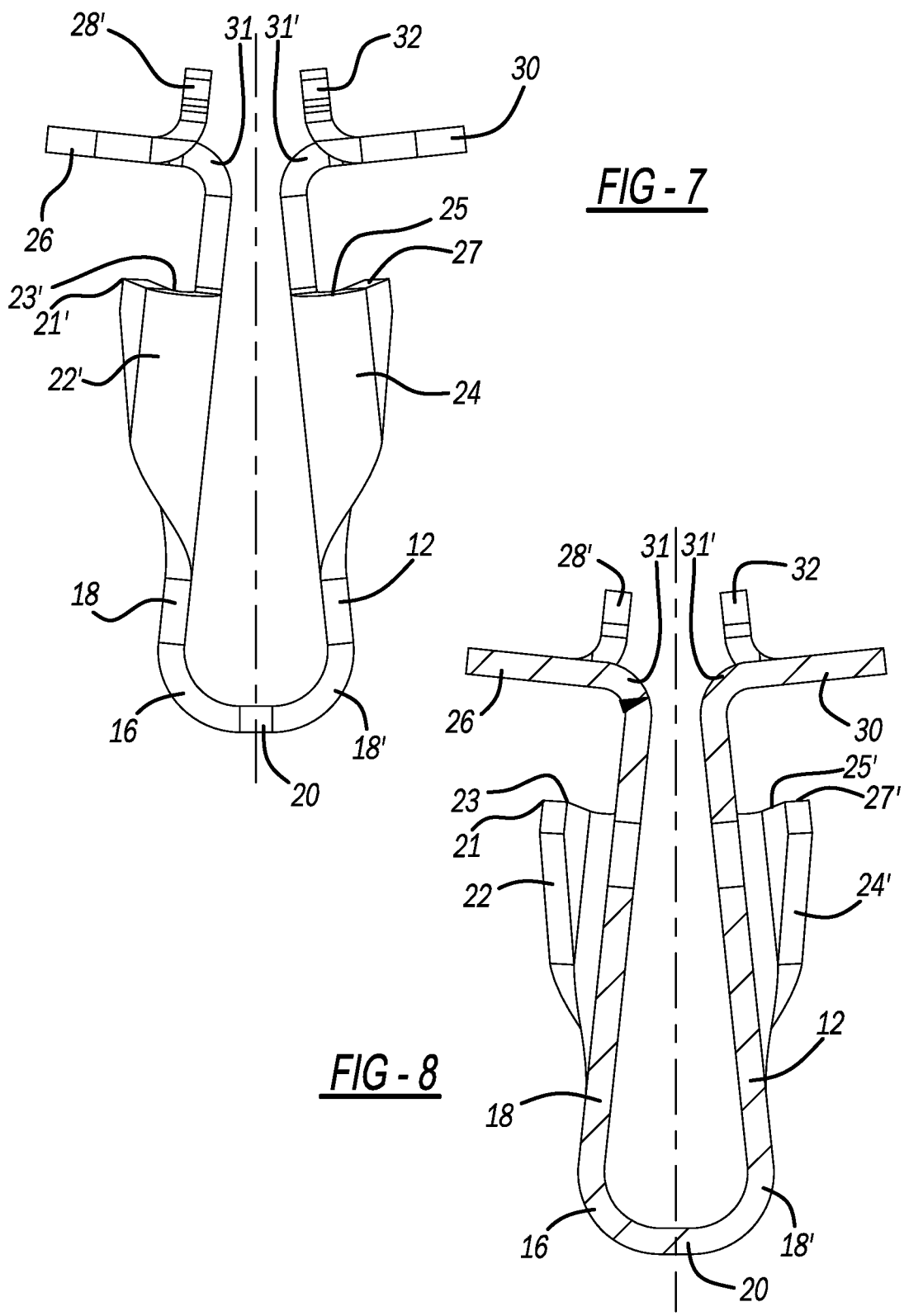

US 10,670,059 B2

HIGH RETENTION FORCE FASTENER

TECHNICAL FIELD

The disclosed inventive concept relates generally to fasteners for attaching two or more substrates together. More particularly, the disclosed inventive concept relates to a high force retention fastener that is relatively easy to install into a hole of at least one of the substrates and is relatively difficult to extract. The hole may be of any shape, including, but not limited to, round, square or rectangular. The high force retention fastener includes a first part in the form of a metal clip and a second part in the form of a plastic insert. The metal clip is provided for initial insertion into the holes of the substrates. The plastic insert includes a leg which is then inserted into the metal clip, thereby causing the metal clip to expand against and engage the underside of the lower substrate. Once the plastic insert is installed into the metal clip, the two or more substrates are secured together.

BACKGROUND OF THE INVENTION

In many industries it is necessary to assemble two components together in an easy and efficient manner. Examples of such requirements are the need to attach one vehicle component to another, such as the attachment of an inner fender liner to a fender or the attachment of one interior component to another.

Conventional metal fasteners used for such applications rely on square or slotted holes. This is the result of manufacturers matching the straight bends of the fastener to the edges of the hole for improved fastener retention. However, square or slotted holes are not preferred among panel manufacturers due to the relatively high cost and complexity of the necessary punches. Another undesirable feature of the square or slotted holes is that the four corners of the hole concentrate panel stress and thus may induce component failure.

Thus an alternative approach to the shape of both the metal fastener and the holes for the fastener are desired. For example, it is desirable to provide a high performance metal fastener that can engage holes formed in two or more substrates such as panels. It is further desired to provide such a metal fastener that is capable of engaging holes in substrates that requires a relatively low insertion effort but that has a high resistance to being extracted from the components.

Accordingly, and as is the case in many industries, known approaches to fastening two or more components together using known fasteners are often undesirable and impractical. An improved fastener arrangement for attaching two components together remains wanting.

SUMMARY OF THE INVENTION

The disclosed inventive concept overcomes the problems associated with known fasteners and fastening arrangements for attaching two or more substrates such as vehicle interior or exterior panels. The fastening system of the disclosed inventive concept comprises a high retention force fastener that can be used to attach two or more substrates. The high retention force fastener includes two components. One component is a metal clip and the other is a plastic insert that can be substantially inserted into the metal clip.

The metal clip comprises a body having opposed panel engagement features extending therefrom, an insertion stop plate spaced apart from the engagement features and plastic insert locking tabs extending from the stop plate. The metal clip is preferably U-shaped and comprises two sides joined by a connector. Each of the sides includes a pair of the panel engagement features.

Preferably, but not absolutely, the each of the panel engagement features is curved. Each pair of panel engagement features includes a first curved engagement feature and a second curved engagement feature. The first and second curved engagement features curve toward one another. Each of the curved engagement features includes an upper edge for engaging one of the substrates. Each of the sides includes a stop plate.

The plastic insert comprises a head and a leg for insertion into the metal clip. The leg extends from the head. The plastic insert additionally includes metal tab engagement arms extending from and integrally formed with the head for engaging the plastic insert locking tabs of the metal clip.

The plastic insert further includes a pair of opposed flexible arms for interference with the insert locking tabs of the metal clip when the plastic insert is inserted into the metal clip. The plastic insert further includes a pair of opposed pre-engagement fasteners. Each of the pre-engagement fasteners extends outward from the leg. The plastic insert additionally includes a latching mechanism hole. The latching mechanism is positionable in the latching mechanism hole to retain the plastic insert in its pre-locking position within the metal clip.

In use, the metal clip of the high retention force fastener is inserted into the holes formed in the two or more panels to be joined. The holes may be of any shape, including, but not limited to, round, square or rectangular. The shapes of the holes may be the same or may be different. Once fully inserted, the curved engagement features and the stop plates preliminarily capture the panels therebetween. The plastic insert is then pushed into the metal clip, thereby expanding the metal clip fully into the holes. The metal tab engagement arms of the head of the plastic insert are locked to the plastic insert locking tabs of the stop plates.

Removal of the high retention force fastener is accomplished by using a removal tool such as the flat end of a screwdriver to pry the plastic insert from the metal clip.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 is an elevated view of one side of a high retention force fastener of the disclosed inventive concept comprising a metal clip and a plastic insert with the plastic insert being partially inserted into the metal clip in its pre-installation position;

FIG. 2 is an elevated view of one end of the high retention force fastener shown in FIG. 1;

FIG. 3 is an underside view of the high retention force fastener shown in FIG. 1;

FIG. 4 is a perspective view of the high retention force fastener shown in FIG. 1 taken from a first angle;

FIG. 7 is an elevated view of one end of the metal clip shown in FIG. 6;

FIG. 8 is a view of the metal clip similar to that of FIG. 7 but shown in section;

DETAILED DESCRIPTION OF THE PREFERRED EMBODIMENT

Figures 5, 6:
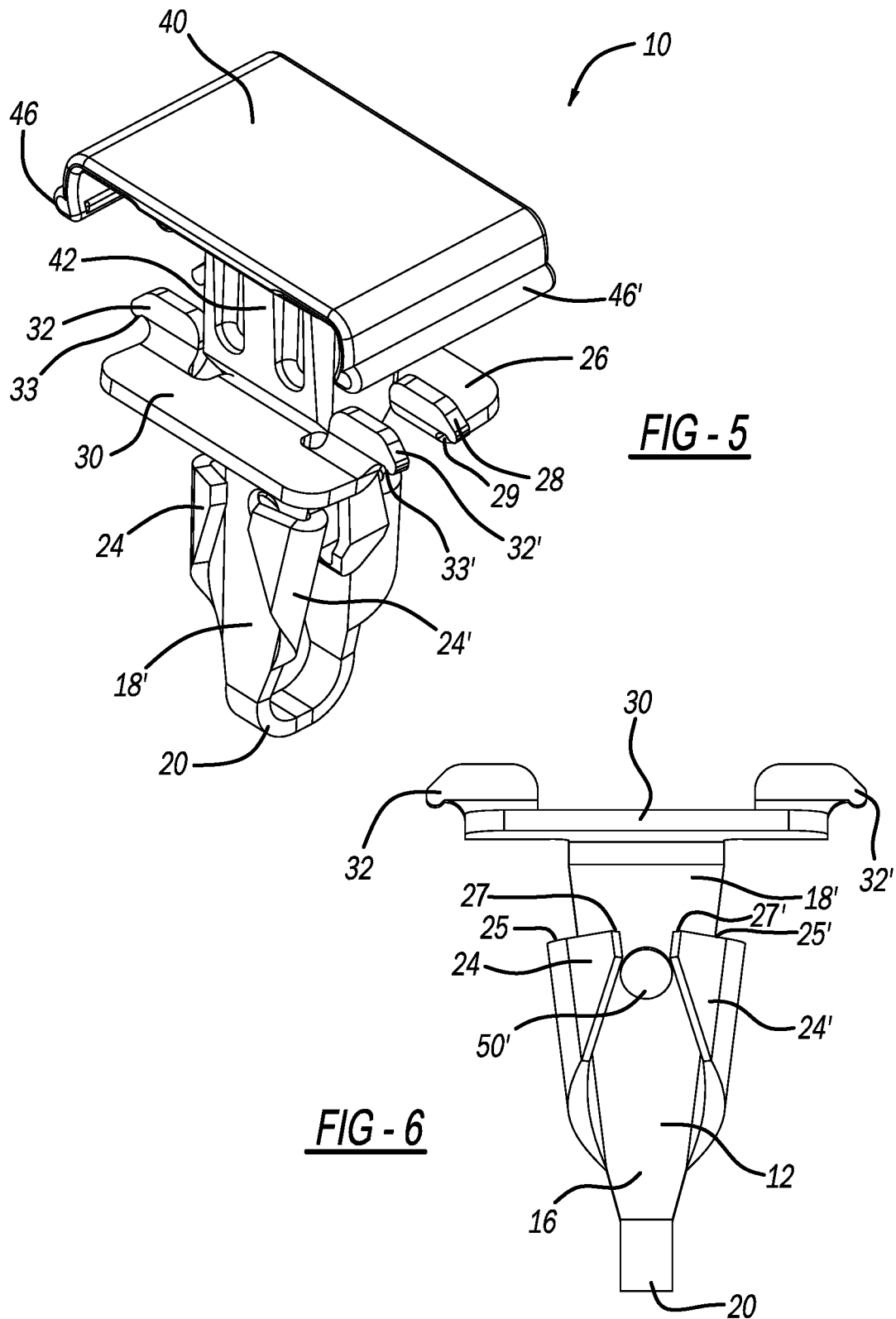
FIG. 5 is a perspective view of the high retention force fastener shown in FIG. 1 taken from a second angle.
FIG. 6 is an elevated view of one side of the metal clip.
Figure 9:
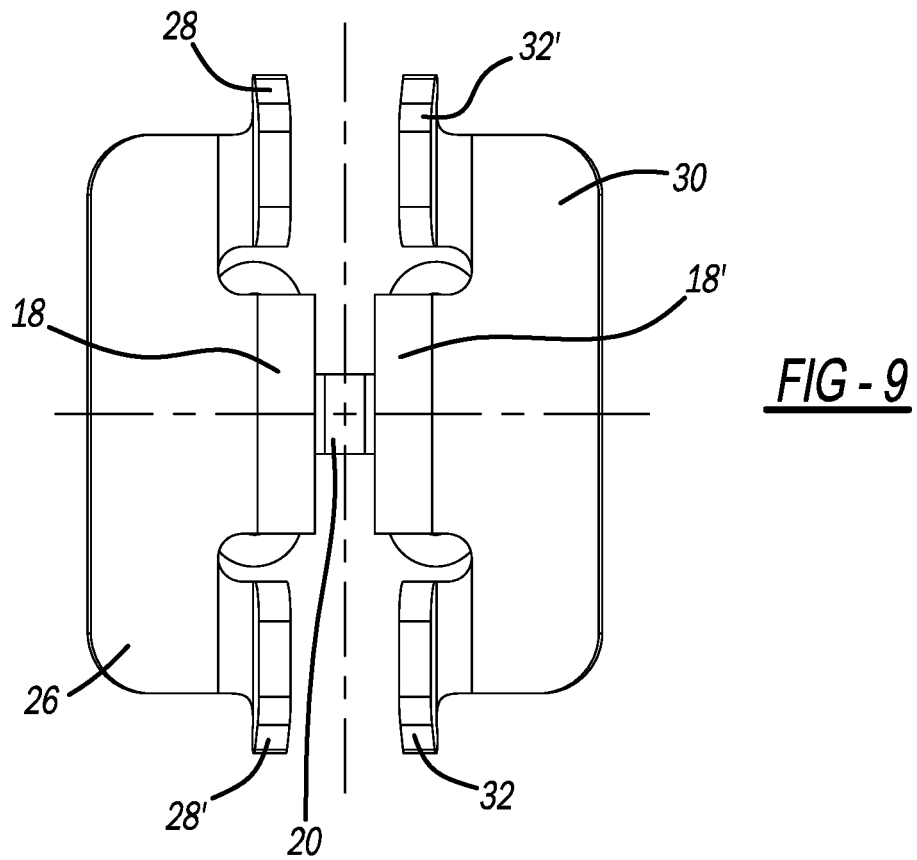
FIG. 9 is a top view of the metal clip shown in FIG. 6.
Figure 10:
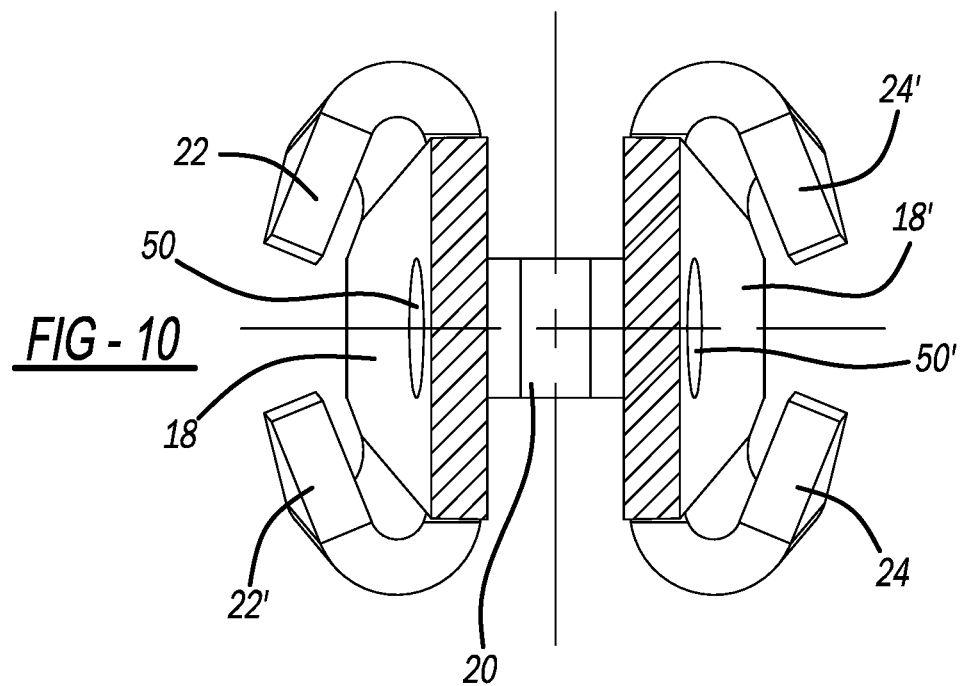
FIG. 10 is a view of the metal clip similar to that of FIG. 9 but shown in section.

As those of ordinary skill in the art will understand, various features of the embodiments illustrated and described with reference to any one of the figures may be combined with features illustrated in one or more other figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

The figures illustrate a high retention force fastener for fastening one object to another and, in particular, provides a system for attaching an upper substrate to a lower substrate. The upper and lower substrates may be selected from any component needing to be attached to another component. The high retention force fastener of the disclosed inventive concept is particularly useful for a broad variety of applications in that it may be used to attach substrates at least one of which has a fastener hole. For example, and without limiting the scope of the disclosed inventive concept, the high retention force fastener of the disclosed inventive concept may be used to attach the plastic liner of a vehicle wheel well which may have a fastener-passing hole to the metal fender which may alternatively or additionally have a fastener-passing hole. The hole may be of any shape, including, but not limited to, round, square or rectangular Having disclosed such an application, it is nonetheless to be understood that the high retention force fastener of the disclosed inventive concept may be used for virtually any other application in which a practical and easy-to-use approach to fastening two components together is needed.

In general, the high retention force fastener of the disclosed inventive concept includes a first part in the form of a metal clip and a second part in the form of a plastic insert. To assemble the two or more substrates together, the metal clip is initially inserted into the fastener-passing hole of the upper substrate and passes therethrough into the fastener-passing hole of the lower substrate.

The plastic insert includes a leg. The leg of the plastic insert is then inserted into the metal clip, thereby causing the metal clip to expand against and engage the underside of the lower substrate. Once the plastic insert is installed into the metal clip, the two or more substrates are secured together. Removal is possible using a tool such as, for example, a flat-ended screwdriver.

The high retention force fastener of the disclosed inventive concept and its two components are illustrated in combination in FIGS. 1 through 5. The metal clip is shown in isolation in FIGS. 6 through 12. The high retention force fastener of the disclosed inventive concept is illustrated relative to two substrates in FIGS. 13 through 17.

Referring to FIGS. 1 through 5, a high retention force fastener according to the disclosed inventive concept is generally illustrated as 10. The high retention force fastener 10 includes a metal clip 12 and a plastic insert 14. The plastic insert 14 is illustrated as being partially inserted into the metal clip 12. In this position, the high retention force fastener 10 is ready for installation into the fastener holes of substrates to be attached. The metal clip 12 is illustrated in isolation in various views in FIGS. 6 through 10. The plastic insert 14 may be formed from any polymerized material suitable for the purpose.

The metal clip 12 is preferably but not exclusively formed from stamped steel, thus providing expandable characteristics. A variety of spring steel metals may be used for the metal clip 12. Non-limiting examples of the metal for use in the metal clip 12 are SAE 1050 carbon steel through SAE 1065 carbon steel.

The metal clip 12 includes a U-shaped body 16. The body 16 includes a first spring or primary retention arm 18 and a second spring or primary retention arm 18'. The primary retention arms 18 and 18' are joined by a connector 20. The primary retention arms 18 and 18' are angled inward to aid in gripping the plastic insert 14.

A pair of spaced apart, wing-like rigid panel engagement features 22 and 22' extend from the first primary retention arm 18. The wing-like rigid panel engagement feature 22 includes an upper edge 23 and the wing-like rigid panel engagement feature 22' includes an upper edge 23'. A pair of spaced apart, wing-like rigid panel engagement features 24 and 24' extend from the second primary retention arm 18'. The wing-like rigid panel engagement feature 24 includes an upper edge 25 and the wing-like rigid panel engagement feature 24' includes an upper edge 25'. The upper edges 23, 23', 25, and 25' engage the underside of the lower substrate upon insertion of the metal clip 12 into the substrate holes as will be described below. Each of the upper edges 23, 23', 25, and 25' includes a corner tip for providing secure engagement with the underside of the lower substrate. The upper edge 23 includes a corner tip 21, the upper edge 23' includes a corner tip 21', the upper edge 25 includes a corner tip 27, and the upper edge 25' includes a corner tip 27'. Each of the corner tips 21, 21', 27, and 27' grip or bite into the underside of the lower substrate when the high retention force fastener 10 is in its secured or engaging position (illustrated in FIGS. 13 and 14 and discussed in relation thereto).

At the end of the first primary retention arm 18 opposite the connector 20 is provided an insertion stop plate 26. Extending from the ends of the stop plate 26 is a pair of locking tabs 28 and 28'. The locking tab 28 includes a hooked end 29 and the locking tab 28' includes a hooked end 29'. At the end of the second primary retention arm 18' opposite the connector 20 is provided an insertion stop plate 30. The stop plate 26 is connected to the first primary retention arm 18 by a shoulder 31. The stop plate 30 is connected to the secondary primary retention arm 18' by a shoulder 31'. Extending from the ends of the stop plate 30 is a pair of locking tabs 32 and 32'. The locking tab 32 includes a hooked end 33 and the locking tab 32' includes a hooked end 33'.

The plastic insert 14 may be made from any of several materials, such as but not limited to nylon or acrylonitrile butadiene styrene (ABS). The flexible nature of plastic as a choice of material for forming the plastic insert 14 is advantageous over other material in that this material is more customizable, engages with the metal clip 12 more easily, and takes up any looseness in the holes of the substrate. The plastic insert 14 may be sized so that it can be adapted for universal fit in a broad variety of metal clips 12.

The plastic insert 14 includes head 40 from which extends an engagement leg 42. A pair of reinforcing ribs 43, 43' are formed under the head 40. The reinforcing ribs 43, 43' provide rigidity and function in part to reduce flexibility of the head 40 in relation to the engagement leg 42, thereby operating to help prevent the plastic insert 14 from coming out of the metal clip 12. The shapes of the reinforcing ribs 43, 43' can be adapted as needed for tuning and may be either solid or slotted. A pair of opposed integral flexible struts 44, 44' extend from each side of the engagement leg 42. The integral flexible integral flexible struts 44, 44' function as pre-engagement fasteners for initial retention within the holes of the substrates being fastened while the high retention force fastener 10 is in its pre-engagement condition as illustrated in FIGS. 1 through 5. Should-receiving recessed areas 45, 45' (shown in FIGS. 11 and 12) are formed on opposite sides of the plastic insert 14. When the high retention force fastener 10 is its pre-insertion condition, the shoulder 31 rests in the recessed area 45 and the shoulder 31' rests in the recessed area 45'. The recessed area 45 includes a ramp 47 and the recessed area 45' includes a ramp 47'. The ramps 47 and 47' operate to separate and drive apart the primary retention arms 18 and 18' while bending the connector 20 as the operator presses the plastic insert 14 from its pre-insertion position to its locking position. While the ramps 47 and 47' are illustrated as being planar, it is to be understood that the ramps 47 and 47' may also be curved.

At opposite ends of the head 40 and integrally molded therewith are provided a pair of opposed metal tab engagement features 46 and 46'. Owing to the plastic material from which the plastic insert 14 is formed, the metal tab engagement features 46 and 46' have a degree of flexibility. This flexibility is a feature that allows the metal tab engagement features 46 and 46' to respectively engage the locking tabs of the metal clip 12 when the plastic insert 14 is inserted into the metal clip 12 to engage the substrates as will be discussed below.

Beneath the head 40 of the plastic insert 14 and integrally molded therewith is a pair of opposed flexible arms 48 and 48'. The opposed flexible arms 48 and 48' provide interference between the plastic insert 14 and the metal clip 12 when the plastic insert 14 is inserted into the metal clip 12 to engage the substrates as will also be discussed below. The flexible arms 48 and 48' also press against the upper substrate and create tension therewith to minimize vibrations that could cause the high retention force fastener 10 to become loose.

Extending outward from opposed sides of the engagement leg 42 is a pair of opposed soft latching mechanisms of which one, soft latching mechanisms 49, is illustrated. On partial insertion of the plastic insert 14 into the metal clip 12 to form the high retention force fastener 10 before it is attached to the substrates, the soft latching mechanisms 49 engages an engagement hole 50 formed in the primary retention arm 18 and an opposite soft latching mechanism engages an engagement hole 50' formed in the primary retention arm 18'. This arrangement assures that the plastic insert 14 and the metal clip 12 will not become separated before insertion into the substrates.

Figure 17:
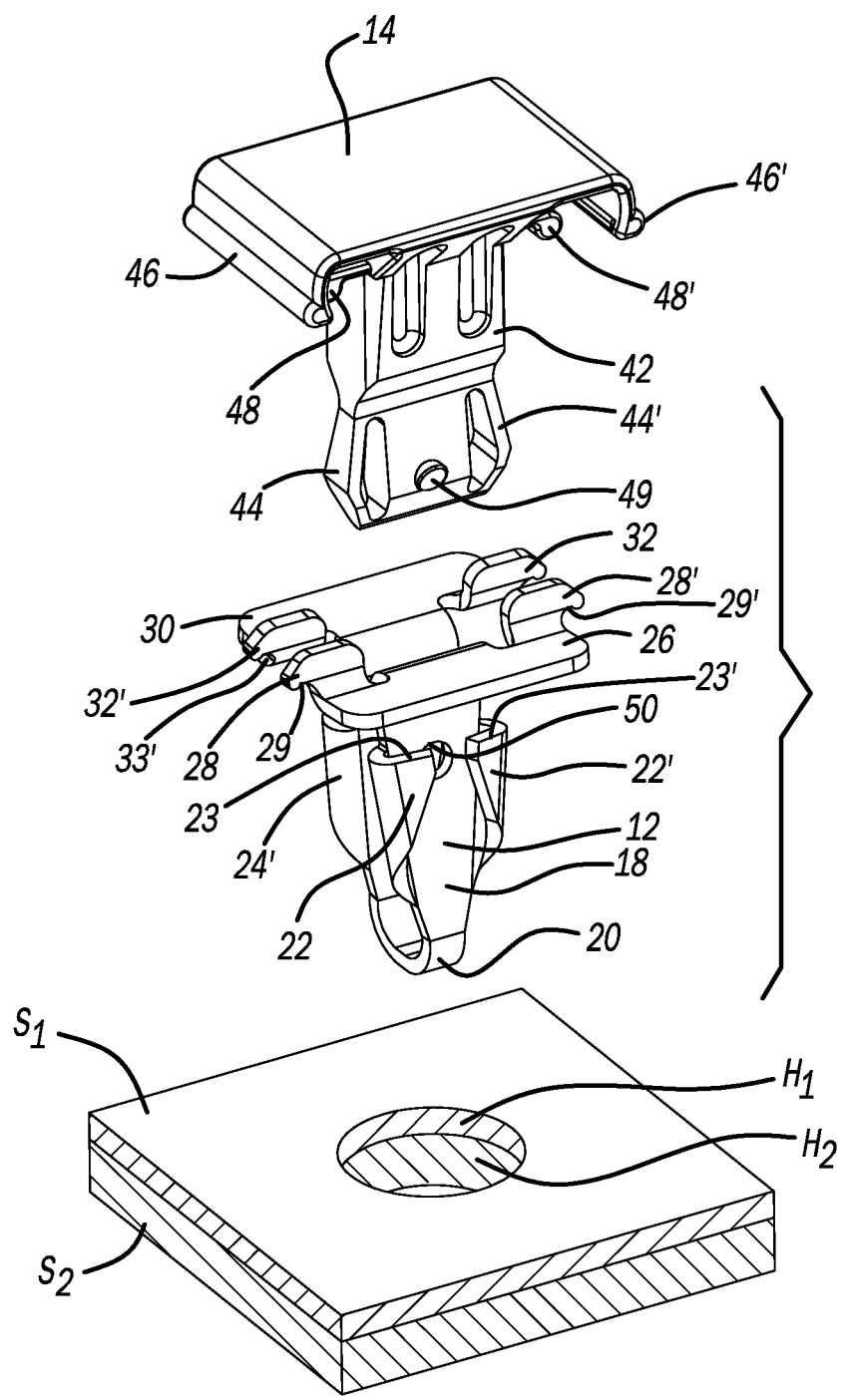
FIG. 17 illustrates the plastic insert, the metal clip, and the two substrates spaced apart from one another.

The high retention force fastener 10 is illustrated in its pre-insertion condition in FIGS. 1 through 5 and the metal clip 12 is illustrated in isolation in FIGS. 6 through 12. The high retention force fastener 10 is illustrated in various stages of insertion in FIGS. 13 through 16 relative to an upper substrate S1 and a lower substrate S2. It is to be understood that while only two substrate layers are illustrated, more than two layers may be attached by the high retention force fastener 10. It is also to be understood that the illustrated layers of substrate material may be of any type or any combination of types of virtually any thickness. FIG. 17 illustrates the high retention force fastener 10 shown in its separate components of the metal clip 12 and the plastic insert 14 relative to the substrates S1 and S2. The substrate S1 includes a hole H1 and the substrate S2 includes a hole H2. The high retention force fastener 10 of the disclosed inventive concept has particular but not exclusive utility in attaching substrates having round holes, square holes, rectangular holes, or any combination thereof.

Figure 11:
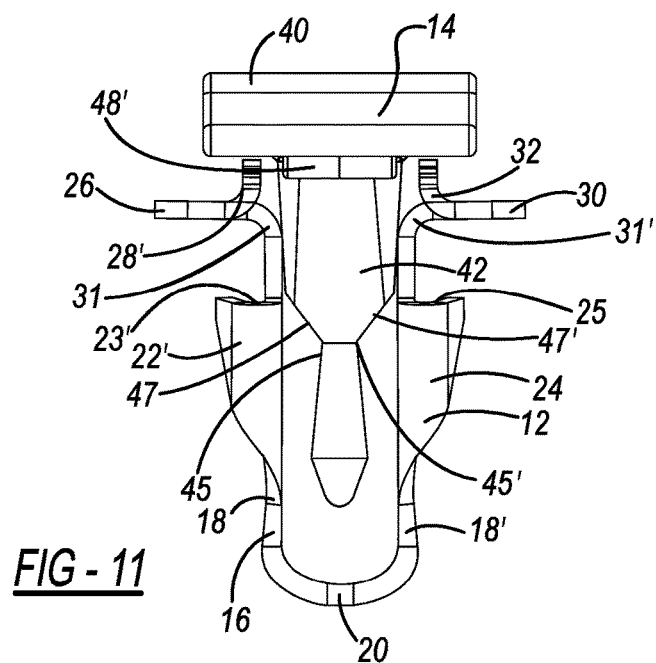
FIG. 11 is a view similar to that of FIG. 2 but illustrating the plastic insert being inserted further into the metal clip in its intermediate position.
Figure 12:
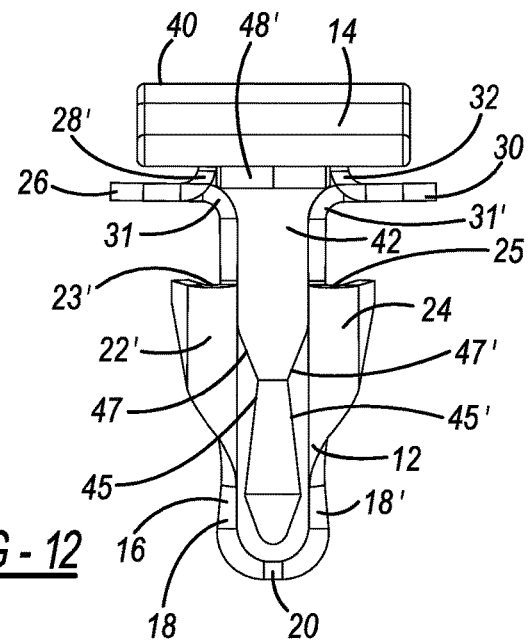
FIG. 12 is a view similar to that of FIG. 11 but illustrating the plastic insert fully inserted further into the metal clip in its locked position.

For attaching two or more panels, the high retention force fastener 10 of the disclosed inventive concept is moved from the pre-installation position illustrated in FIG. 2 through an intermediate position illustrated in FIG. 11, to a locked position illustrated in FIG. 12. More particularly and as illustrated in FIG. 2, the plastic insert 14 is only partially inserted into the metal clip 12. The pair of opposed integral flexible struts 44, 44' retain the primary retention arms 18 and 18'. In this resting position, the shoulder 31 rests in the recessed area 45 and the shoulder 31' rests in the recessed area 45'. In this position, the high retention force fastener 10 is ready for installation into the fastener holes of substrates to be attached.

Once the high retention force fastener 10 is inserted into two aligned holes formed in two side-by-side substrates (illustrated in FIGS. 13 through 17 and discussed in relation thereto), the installer presses against the head 40 to move the plastic insert 14 into the metal clip 12 through an intermediate position such as that illustrated in FIG. 11 in which the 31 from which extends an engagement leg 42. This motion causes the shoulder 31 to be moved out of the recessed area 45, the shoulder 31' to be moved out of the recessed area 45', and the retention arms 18 and 18' to be spread apart as the shoulders 31 and 31' ride respectively along the ramps 47 and 47'.

To complete the locking engagement of the high retention force fastener 10 in the holes of the substrate and thereby locking the substrates against one another, the operator pushes the head 40 of the plastic insert 14 until it bottoms out in the metal clip 12. In this position, the locking tab 28' engages the metal tab engagement feature 46 and the locking tab 28' engages the metal tab engagement feature 46' thereby locking the plastic insert 14 against movement out of the metal clip 12.

Figures 13, 14:
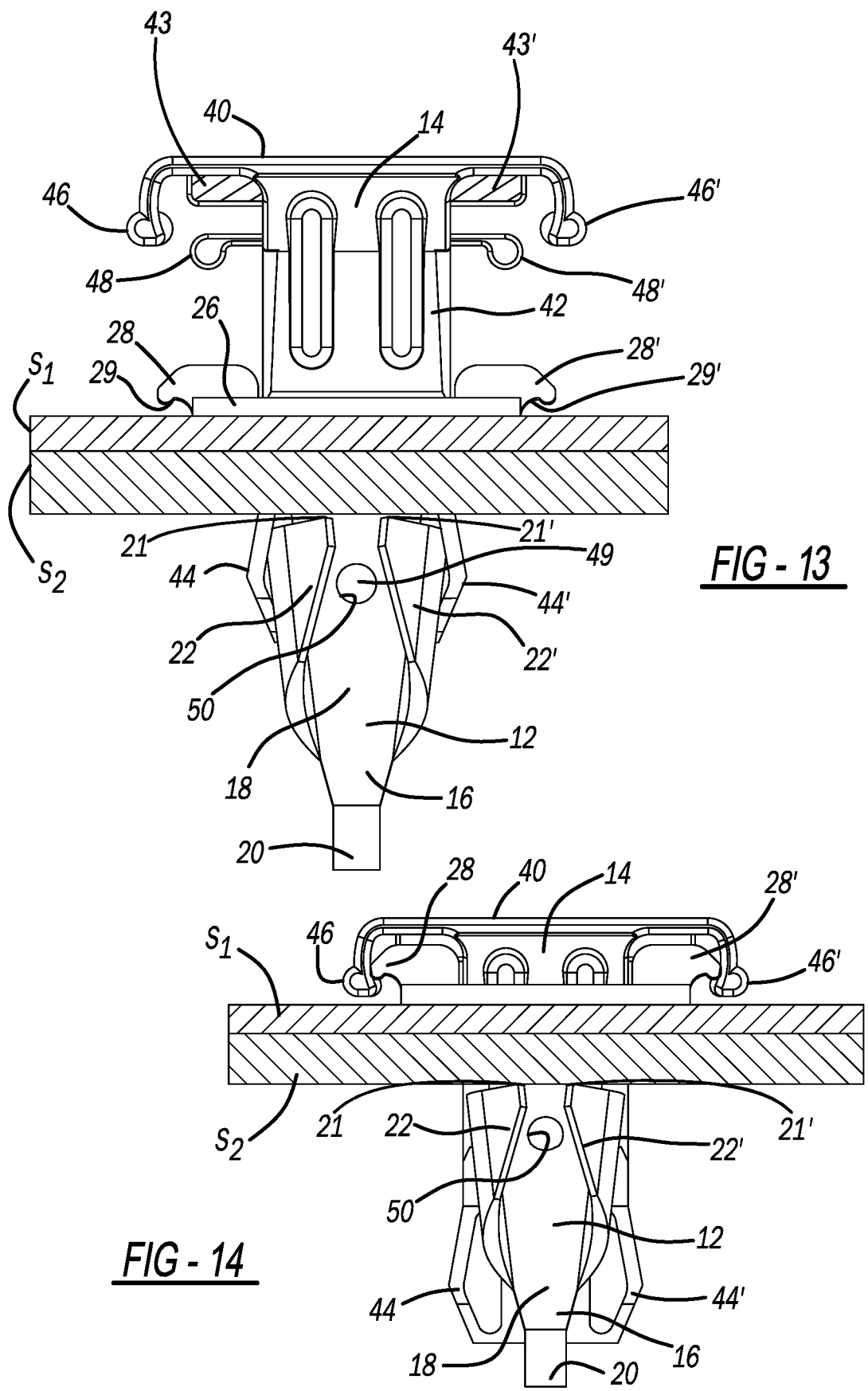
FIG. 13 is a side view of the high retention force fastener of the disclosed inventive concept preliminarily inserted into and partially through holes formed in two substrates shown in section.
FIG. 14 is a view similar to that of FIG. 13 but illustrating the plastic insert having been inserted into the metal clip in its fixed and locked fastening position.
Figure 15:
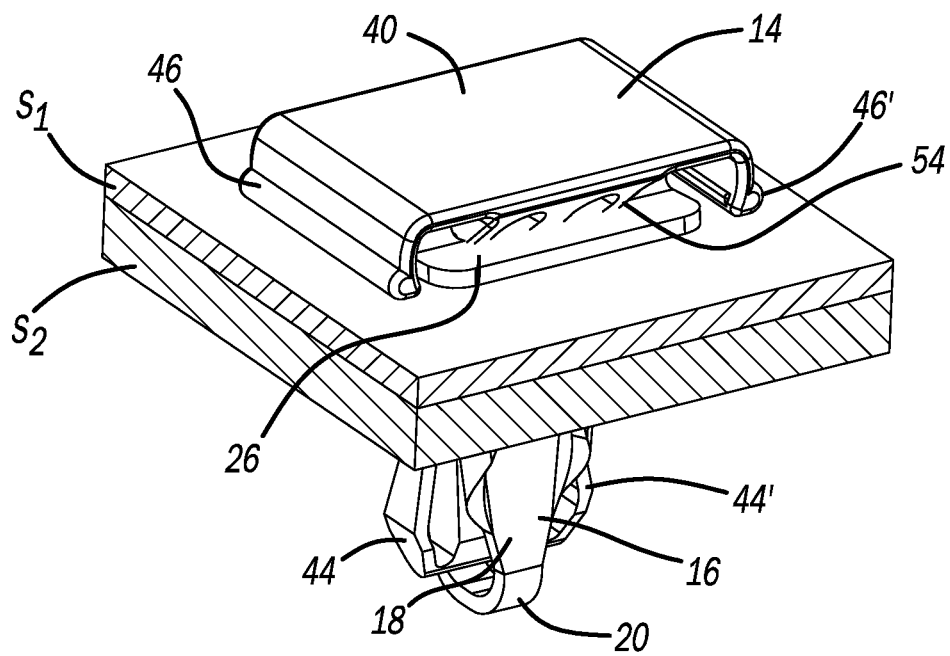
FIG. 15 is a view similar to that of FIG. 14 but shown from a perspective view that generally illustrates the top of the high retention force fastener fixed to two substrates.
Figure 16:
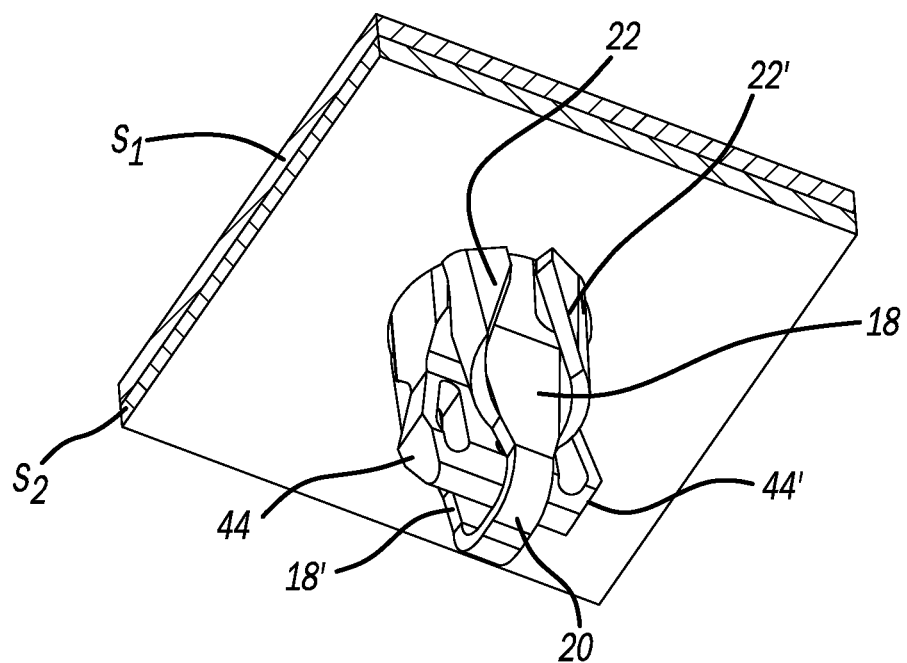
FIG. 16 is a view similar to that of FIG. 14 but shown from a perspective view that generally illustrates the underside of the high retention force fastener fixed to two substrates.

Referring to FIG. 13, a side view of the high retention force fastener 10 in position relative to the upper substrate S1 and the lower substrate S2 is shown. However, upon being initially inserted into the holes of the substrates S1 and S2 but before the high retention force fastener 10 is fully inserted into the holes as illustrated in FIG. 14, the opposed integral flexible struts 44, 44' function as pre-engagement fasteners for initial retention of the high retention force fastener 10 in the within the holes of the substrates S1 and S2. Once fully inserted and in this pre-locking position, the U-shaped body 16 of the metal clip 12 has been inserted by an installer into two coaxial holes formed in the substrates. Insertion depth of the metal clip 12 into the holes is limited by the insertion stop plates 26 and 30.

Upon insertion of the high retention force fastener 10 into the holes of the substrates, the wing-like rigid panel engagement features 22 and 22' of the first primary retention arm 18 and the pair of wing-like rigid panel engagement features 24 and 24' of the second primary retention arm 18' are slightly bent inward toward the U-shaped body 16 of the metal clip 12, thereby allowing passage through the holes. Once through the holes, the wing-like rigid panel engagement features 22, 22', 24, and 24' spring back partially to their original shape and the upper edges 23 and 23' of the wing-like rigid panel engagement features 22 and 22' respectively and the upper edges 25 and 25' of the wing-like rigid panel engagement features 24 and 24' engage the underside of the lower substrate S2, thereby preventing withdrawal of the metal clip 12 from the holes of the substrates S1 and S2.

After the high retention force fastener 10 is initially inserted into the holes of the substrates S1 and S2, the installer then presses the plastic insert 14 into the metal clip 12 until the plastic insert 14 can be inserted no further. The soft latching mechanisms, of which one, mechanism 49 is shown, are released from their engagement holes 50 and 50'.

Three mechanical events occur virtually simultaneously upon complete insertion of the plastic insert 14 into the metal clip 12. One event, the initial event, is that the flexible arm 48 provided below the head 40 contacts the upper surfaces of the locking tabs 28 and 32' and the flexible arm 48', also provided below the head 40, contacts the upper surfaces of the locking tabs 28' and 32, thereby providing a limited but specific degree of interference between the plastic insert 14 and the metal clip 12.

An event that immediately follows the initial event involving the flexible arms 48 and 48' described above is the locking of the head 40 to the metal clip 12. Specifically, the metal tab engagement feature 46 engages both the hooked end 29 of the locking tab 28 and the hooked end 33' of the locking tab 32' while the metal tab engagement feature 46' engages both the hooked end 29' of the locking tab 28' and the hooked end 33 of the locking tab 32.

Insertion of the plastic insert 14 into the metal clip 12 simultaneously causes the U-shaped body 16 of the metal clip 12 to fully expand within the holes H1 and H2 of the substrates S1 and S2 respectively. At this point and upon full insertion of the plastic insert into the metal clip 12, the corner tips 21, 21', 27, and 27' bite into and lock against the underside of the substrate S2.

Once the high retention force fastener 10 is locked into position in the substrates, a relatively high degree of force is required for its removal (at least about 4 kN), particularly as compared with the degree of force needed for its insertion (less than 45N). However, if removal of the high retention force fastener 10 from the substrates S1 and S2 is desired, a tool suitable for the purpose, such as a flat tool (a screwdriver is a non-limiting example) is inserted into a slot 54 illustrated in FIG. 15. The plastic insert 14 is pried from the metal clip 12 by rotation of the head of the screwdriver. As the plastic insert 14 is removed, the metal clip 12 collapses and is then removed from the substrates S1 and S2. If a remover attempts to lift the metal clip 12 from the substrates S1 and S2, the upper edges 23 and 23' of the wing-like rigid panel engagement features 22 and 22' respectively and the upper edges 25 and 25' of the wing-like rigid panel engagement features 24 and 24' will be forced to spread apart.

One skilled in the art will readily recognize from such discussion, and from the accompanying drawings and claims that various changes, modifications and variations can be made therein without departing from the true spirit and fair scope of the invention as defined by the following claims.

What is claimed is:

1. A fastening system comprising:
a first substrate having a fastener-passing bore;
a second substrate having a fastener-passing bore; and
a fastener comprising a metal clip and a plastic insert, said metal clip comprising a body having opposed substrate engagement features extending therefrom, an insertion stop plate spaced apart from said engagement features and plastic insert locking tabs extending from said stop plate, said plastic insert comprising a head and a leg extending from said head, said plastic insert further including metal tab engagement features extending from said head for engaging said plastic insert locking tabs of said metal clip and for locking said plastic insert against movement out of said metal clip, said plastic insert being substantially insertable into said metal clip between a first, pre-insertion position in which said plastic insert substantially extends out of said metal clip to a locked position in which said plastic insert is substantially inserted into said metal clip;
wherein said metal clip is U-shaped and comprises two sides joined by a connector, each of said sides including a pair of said substrate engagement features.

2. The fastening system of claim 1, wherein said substrate engagement features are curved.

3. The fastening system of claim 2, wherein said pair of substrate engagement features includes a first curved engagement feature and a second curved engagement feature, said first and second curved engagement features curving toward one another.

4. The fastening system of claim 3, wherein each of said curved engagement features includes an upper edge for engaging one of said substrates.

5. The fastening system of claim 1, wherein each of said sides includes the stop plate.

6. The fastening system of claim 1, wherein said plastic insert further includes a pair of opposed flexible arms for interference with said plastic insert locking tabs of said metal clip.

7. The fastening system of claim 1, wherein said plastic insert further includes a pair of opposed pre-engagement fasteners, each of said pre-engagement fasteners extending outward from said leg.

8. The fastening system of claim 1, wherein said plastic insert includes a latching mechanism and said metal clip includes a latching mechanism hole, said latching mechanism being positionable in said latching mechanism hole.

9. A fastener for attaching two or more panels, each of the panels having a fastener-receiving hole, the fastener comprising:
 a metal clip comprising a body having opposed and curved panel engagement features extending therefrom, an insertion stop plate spaced apart from said engagement features and polymerized insert locking tabs extending from said stop plate; and
 a polymerized insert comprising a head and a leg extending from said head, said polymerized insert further including metal tab engagement features extending from said head for engaging said polymerized insert locking tabs of said metal clip and for locking said polymerized insert against movement out of said metal clip, said polymerized insert being movable relative to said clip between a first, pre-insertion position for insertion of said fastener into the fastener-receiving holes, and a second, locked position for locking the panels together;
 wherein said metal clip is U-shaped and comprises two sides joined by a connector, each of said sides including a pair of said panel engagement features.

10. The fastener of claim 9, wherein said pair of panel engagement features includes a first curved engagement feature and a second curved engagement feature, said first and second curved engagement features curving toward one another.

11. The fastener of claim 10, wherein each of said curved engagement features includes an upper edge for engaging one of the panels.

12. The fastener of claim 9, wherein each of said sides includes the stop plate.

13. The fastener of claim 9, wherein said polymerized insert further includes a pair of opposed flexible arms for interference with said polymerized insert locking tabs of said metal clip.

14. The fastener of claim 9, wherein said polymerized insert further includes a pair of opposed pre-engagement fasteners, each of said pre-engagement fasteners extending outward from said leg.

15. The fastening system of claim 9, wherein said polymerized insert includes a latching mechanism and said metal clip includes a latching mechanism hole, said latching mechanism being positionable in said latching mechanism hole.

16. A fastener comprising:
 a metal clip comprising a body having a first side and a second side, each side having a pair of opposed and curved panel engagement features extending therefrom, said pair of opposed and curved panel engagement features curving toward one another, an insertion stop plate spaced apart from said engagement features and polymerized insert locking tabs extending from said stop plate, each of said engagement features having a shoulder; and
 a polymerized insert comprising a head and a leg extending from said head, said polymerized insert further including metal tab engagement features extending from said head for engaging said polymerized insert locking tabs of said metal clip and for locking said polymerized insert against movement out of said metal clip, said polymerized insert having opposed recessed areas, one of said shoulders of said metal clip being seated in one of said recessed areas of said insert.

17. The fastener of claim 16, wherein each of said curved engagement features includes an upper edge for engaging a panel and wherein each of said sides includes the stop plate, each upper edge including a corner tip.

18. The fastener of claim 16, wherein said polymerized insert further includes a pair of opposed flexible arms for interference with said polymerized insert locking tabs of said metal clip.

* * * * *